E. BENNETT.
CONDUCTING MATERIAL AND METHOD OF PRODUCING THE SAME.
APPLICATION FILED JUNE 2, 1899. RENEWED FEB. 19, 1902.
1,023,917.
Patented Apr. 23, 1912.
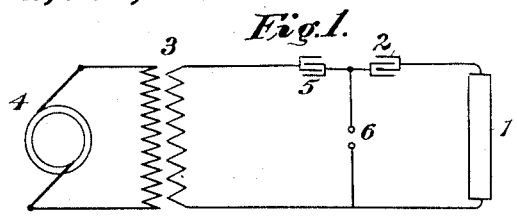
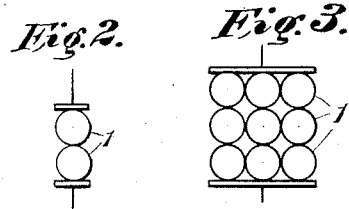
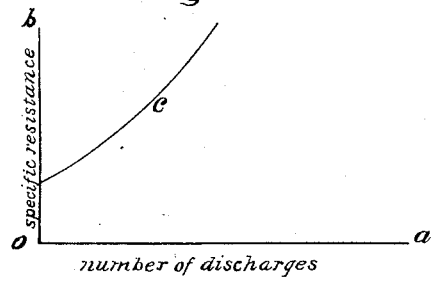
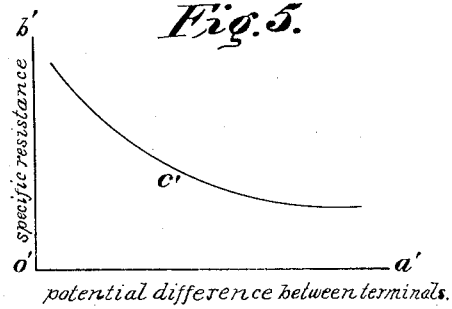
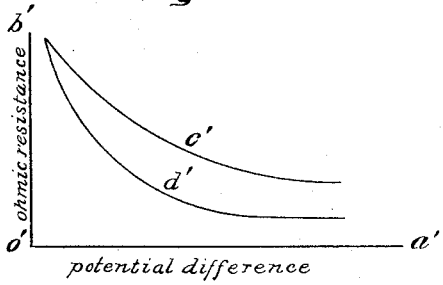
WITNESSES:
INVENTOR
Edward Bennett
BY
ATTORNEY.

UNITED STATES PATENT OFFICE.

EDWARD BENNETT, OF PITTSBURGH, PENNSYLVANIA, ASSIGNOR TO WESTINGHOUSE ELECTRIC & MANUFACTURING COMPANY, A CORPORATION OF PENNSYLVANIA.

CONDUCTING MATERIAL AND METHOD OF PRODUCING THE SAME.

1,023,917.     Specification of Letters Patent.     Patented Apr. 23, 1912.

Application filed June 2, 1899, Serial No. 719,093. Renewed February 19, 1902. Serial No. 94,821.

*To all whom it may concern:*

Be it known that I, EDWARD BENNETT, a citizen of the United States, residing at Pittsburgh, in the county of Allegheny and State of Pennsylvania, have invented a new and useful Improvement in Conducting Material and Methods of Producing the Same, of which the following is a specification.

My invention relates to electrical apparatus, and it has for its object to produce, by simple, easily practised and effective method, an electric conductor of relatively low conductivity having certain desirable characteristics and adapted to use in any relation where ohmic resistance is necessary.

The material which I propose to use in practising my invention consists of a mixture or composition of one or more conducting materials, one or more non-conducting materials and a suitable binder, all before combining being in granular or powdered form, the proportions employed being such as will give the desired amount of resistance to the passage of the electric current therethrough. The materials that I have found to be well adapted to practising my invention are graphite, kaolin and starch, the latter being the binding material, but I do not intend to limit my invention to any specific materials or to any specific relative amounts of such materials. After making the mixture, the material is compressed by any suitable means into the form desired and then subjected to a high degree of heat for a considerable period of time. I have found that baking at a white heat for about three hours gives satisfactory results. A rod or block thus treated becomes hard and when struck by another hard body, gives a clear ringing sound. I have usually found it convenient and desirable to form the resistance material into rods of substantially cylindrical form, but I desire it to be understood that my invention is not limited in this regard.

I have found by experiment that the specific resistance of bodies of molded and baked material having the composition above specified, is greatly increased by subjecting such bodies to oscillatory currents of very high frequency. For example, I have found that the specific resistance of a baked rod of the composition above specified, under a one volt difference of potential between terminals, is multiplied about fourteen times by a static discharge along the line of resistance measurement. Five discharges serve to multiply the specific resistance nearly one hundred times and twelve discharges multiply it about four hundred times.

I am unable to state with certainty what change takes place in the material whereby the change in specific resistance is effected. I regard it as probable, however, that the oscillatory discharges serve to rearrange the molecules or atoms of the material in such a manner as to provide an innumerable number of infinitesimal air-gaps. While I do not commit myself to this theory, it seems to be supported by the results obtained in connection with the treatment of a baked cubical block composed of graphite and kaolin. Such a block, after being subjected to high frequency static discharges for a period of thirty seconds, was found to have a specific resistance, at a potential difference of one volt between the terminals employed in treating the block, two thousand times greater than that indicated before treatment, while the specific resistance measured between opposite sides at right angles to the line of static discharges was approximately the same after as before treatment. Treatment for a period of sixty seconds served to increase the specific resistance measured in the line of the static discharges to more than twelve thousand times what it was before treatment without any substantial change in the resistance measured in either of the two lines at right angles to that of the discharges. Whatever may be the physical or other change in the material by virtue of which the specific resistance is increased, such increased resistance appears to be permanent under ordinary conditions of service and treatment.

It has been fully demonstrated in practice that the specific resistance of bodies constructed and treated as hereinbefore described varies inversely with changes in the potential between terminals and independently of temperature conditions. This is a very important characteristic and, so far as I am aware, is peculiar to my present invention. Prior to my present invention, changes in specific resistance, either directly or inversely, with changes in potential were dependent upon the temperature coefficient of the material of which the conductor was composed.

If a plurality of bodies of material made and treated as above described, as, for example, cylindrical rods, be placed side by side so that the adjacent surfaces are tangent to each other, the ohmic resistance is considerably in excess of that presented by a single body of equivalent dimensions, this increase in resistance being probably due to the imperfect contact made between the adjacent surfaces.

In the accompanying drawing, Figure 1 is a diagram of circuits and apparatus adapted for treating a high resistance conductor in accordance with my invention to increase its specific resistance. Figs. 2 and 3 are detail views of other arrangements of conducting bodies for treatment. Fig. 4 is a diagram illustrating the increase in specific resistance of the material with the number of discharges of static or oscillatory current. Fig. 5 is a diagram illustrating the variation in specific resistance under changes of potential. Fig. 6 is a diagram illustrating the comparative resistance variation of a single resistance body and a plurality of such bodies in contact when subjected to different voltages.

Referring now particularly to Fig. 1, the rod 1, which is formed of a suitable composition, such, for example, as has been already described, has one terminal connected to one element of a condenser 2 which may be a battery of Leyden jars, or have any other suitable form, and its other terminal connected to one terminal of the secondary winding of a transformer 3, the primary winding of which is supplied with an alternating current from a suitable generator 4. The other terminal of the secondary winding of the transformer 3 is connected to one member of a condenser 5 which may be of any suitable construction. The other members of the condensers are connected together and to one terminal of a spark gap 6, the other terminal of this spark gap being connected to the conductor joining one end of the rod 1 with the secondary of the transformer 3. With this arrangement of apparatus an oscillatory current of very high potential and frequency may be made to pass through the rod 1, in order to increase its specific resistance to the amount desired. If the secondary electromotive force of the transformer 3 is sufficiently high, a momentary treatment of the resistance material will be sufficient to give the results desired. The high-frequency current which I utilize in practising my method may, of course, be derived from any suitable source, that shown being intended as merely indicative of any means having the required generating capabilities. Instead of connecting the rod 1 in circuit, as indicated, any desired number of such rods may be treated at one time, as indicated, for example, in Figs. 2 and 3, two of such rods being shown arranged for treatment in Fig. 2, and nine of such rods being similarly arranged for treatment in Fig. 3.

In Fig. 4 the specific resistance of the material treated is measured in the direction of the line $ob$, and the number of discharges in the direction of the line $oa$, the resulting curve $c$ indicating clearly the increase in specific resistance with the number of discharges to which the material is subjected.

In Fig. 5 the specific resistance of the material is measured in the direction of the line $o'b'$ and the differences of potential between terminals in the direction of the line $o'a'$, the curve $c'$ showing clearly the ratio of change in specific resistance to changes in potential applied to the resistance material.

In Fig. 6 the coördinates are the same as in Fig. 5, except that the values indicated as measured along the line $o'b'$ are in the terms of ohmic resistance, this term being employed by reason of the fact that the curve $d'$ indicates the variation in the resistance of a plurality of bodies of resistance material placed in contact, the curve $c'$ corresponding to the same line in Fig. 5 representing the variation in resistance of a single body of material.

Resistance bodies treated by the method and having the characteristics herein set forth may be utilized to perform any functions for which they may be adapted but, so far as I am now aware, they will be found useful chiefly as elements of lighting arresters and, when so utilized, the resistance material may be utilized in the form of rods arranged as indicated in Fig. 1, Fig. 2 or Fig. 3 of the drawing, or otherwise.

I claim as my invention:—

1. The method of treating a solid body of conducting material to increase its specific resistance, which consists in subjecting it to the action of an oscillatory electric current of very high frequency, substantially as described.

2. The method of treating a solid body of conducting material to increase its specific resistance, which consists in subjecting it to the action of an oscillatory electric current of high potential and frequency, substantially as described.

3. The method of treating a solid body of conducting material to increase its specific resistance which consists in subjecting it to the action of an oscillatory electric current of very high frequency in approximately the direction in which electrical pressure is to be applied when the body is in service as a resistance medium.

4. The method of treating a solid electric conductor to increase its specific resistance which consists in subjecting it to the action of an oscillatory electric current of high potential and frequency in approximately the direction in which electrical pressure is to be applied when the conductor is in service as an impedance body.

5. The method of making a conducting body of normally high resistance which consists in forming a mixture of suitable conducting and non-conducting materials and a binder in suitable proportions, then compressing said mixture to form a rod or block, then baking the rod or block and finally subjecting the baked rod or block to the action of an oscillatory current of high frequency, substantially as described.

6. The method of making an electrical conductor the resistance of which decreases with an increase of potential difference between its terminals, which consists in forming a mixture of graphite, kaolin and a binder, then compressing said mixture into a compact body, then subjecting said body to a high degree of heat, and finally subjecting it to the action of an oscillatory electric current of high frequency, substantially as described.

7. A body of conducting material adapted for interposition in an electric circuit, the specific resistance of such material varying inversely with changes in potential at an approximately constant temperature.

8. The method of treating a solid conducting body to adapt it for subjection to working electrical pressure which consists in passing an oscillatory electric current of high frequency through it in the direction in which the working electrical pressure is to be applied.

In testimony whereof I have hereunto subscribed my name this 27th day of May, 1899.

EDWARD BENNETT.

Witnesses:
WESLEY G. CARR,
HUBERT C. TENER.